United States Patent
Olson et al.

[11] Patent Number: 6,050,145
[45] Date of Patent: *Apr. 18, 2000

[54] PRESSURE TRANSMITTER WITH HIGH PRESSURE ISOLATOR MOUNTING ASSEMBLY

[75] Inventors: Mark H. Olson, Minneapolis; Michael B. Jost, Savage; Brian J. Bischoff, Chanhassen; Thomas M. Moser, Minneapolis, all of Minn.

[73] Assignee: Rosemount Inc., Eden Prairie, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,244

[22] Filed: Jul. 10, 1997

Related U.S. Application Data

[63] Continuation of application No. 08/430,583, Apr. 28, 1995, abandoned.

[51] Int. Cl.⁷ .................................................... G01L 7/00
[52] U.S. Cl. .................................................. 73/706; 73/756
[58] Field of Search ........................... 73/706, 721, 727, 73/756

[56] References Cited

U.S. PATENT DOCUMENTS

| | | | |
|---|---|---|---|
| 2,944,199 | 7/1960 | Hudson | 317/246 |
| 4,019,388 | 4/1977 | Hall, II et al. | 73/398 AR |
| 4,227,418 | 10/1980 | Bonner et al. | 73/706 |
| 4,246,797 | 1/1981 | Myles | 73/744 |
| 4,295,117 | 10/1981 | Lake et al. | 338/4 |
| 4,322,980 | 4/1982 | Suzuki et al. | 73/727 |
| 4,373,397 | 2/1983 | Keller | 73/721 |
| 4,414,851 | 11/1983 | Maglic | 73/706 |
| 4,502,335 | 3/1985 | Wamstad et al. | 73/721 |
| 4,536,820 | 8/1985 | Binder et al. | 361/283 |
| 4,542,435 | 9/1985 | Freud et al. | 361/283 |
| 4,562,742 | 1/1986 | Bell | 73/718 |
| 4,617,607 | 10/1986 | Park et al. | 361/283 |
| 4,658,651 | 4/1987 | Le | 73/708 |
| 4,690,004 | 9/1987 | Tavis | 73/862.62 |
| 4,809,555 | 3/1989 | Kunz | 73/727 |
| 4,918,992 | 4/1990 | Mathias | 73/727 |
| 4,926,696 | 5/1990 | Hartonidis et al. | 73/205 |
| 4,930,929 | 6/1990 | Maglic | 403/29 |
| 4,970,898 | 11/1990 | Walish et al. | 73/706 |
| 4,982,608 | 1/1991 | Märki et al. | 73/756 |
| 5,038,069 | 8/1991 | Lukasiewicz et al. | 310/338 |
| 5,079,953 | 1/1992 | Martin et al. | 73/718 |
| 5,116,331 | 5/1992 | Chapman | 73/74 |
| 5,126,617 | 6/1992 | Lukasiewicz et al. | 310/338 |
| 5,157,972 | 10/1992 | Broden et al. | 73/718 |
| 5,186,055 | 2/1993 | Kovacich et al. | 73/727 |
| 5,212,989 | 5/1993 | Kodama et al. | 73/706 |
| 5,222,397 | 6/1993 | Kodama | 73/756 |
| 5,242,715 | 9/1993 | Schoen et al. | 427/386 |
| 5,257,547 | 11/1993 | Boyer | 73/756 |
| 5,275,054 | 1/1994 | Park | 73/724 |
| 5,315,877 | 5/1994 | Park et al. | 73/724 |
| 5,329,819 | 7/1994 | Park et al. | 73/724 |
| 5,343,757 | 9/1994 | Tate | 73/724 |
| 5,349,865 | 9/1994 | Kavli et al. | 73/724 |
| 5,376,860 | 12/1994 | Sato | 310/346 |
| 5,394,751 | 3/1995 | Ishibashi | 73/756 |

FOREIGN PATENT DOCUMENTS

| | | |
|---|---|---|
| 0 317 664 A1 | 5/1989 | European Pat. Off. . |
| 26 30 640 A1 | 1/1977 | Germany . |

*Primary Examiner*—William Oen
*Attorney, Agent, or Firm*—Westman, Champlin & Kelly, PA

[57] ABSTRACT

A pressure transmitter includes an isolator mounting assembly for isolating process fluid from an interior cavity of the pressure transmitter. The isolator mounting assembly includes an isolator plug for receiving the process fluid line pressure and coupling the line pressure to a sensor cavity formed by a header joined to a distal end of the plug. A ring member is attached to the header and the distal end of the plug to reinforce the joint formed between the isolator plug and the head. In another embodiment, the isolator mounting assembly includes a base and a support having first and second opposed ends. The first end is rigidly bonded to the pressure sensor while an epoxy joint joins the second end of the support to the base.

31 Claims, 5 Drawing Sheets

PRESSURE TRANSMITTER WITH HIGH PRESSURE ISOLATOR MOUNTING ASSEMBLY

This is a continuation of application Ser. No. 08/430,583, filed Apr. 28, 1995 now abandoned.

BACKGROUND OF THE INVENTION

The present invention relates to pressure transmitters. More particularly, the present invention relates to an isolator mounting assembly for supporting a pressure sensor and for isolating the pressure sensor and an interior cavity of the transmitter from a process line fluid to be measured.

Isolator mounting assemblies used to isolate a pressure sensor from the fluid to be measured in a process line are known. Typically, the isolating mounting assembly mounts at the base of a transmitter housing in a hole that opens to an interior cavity of the transmitter. The interior cavity protects known circuitry that connects to the pressure sensor in order to obtain a signal proportional to the pressure in the process line. The isolator mounting assembly includes a connector or fitting that is connectable to the process line to receive the process fluid for measurement. The connector has threads which engage corresponding threads of the transmitter housing to secure the connector to the housing. At an end remote from the process line, the connector accepts a machined plug that has a compliant isolator diaphragm which faces the process fluid. The isolator diaphragm isolates a cavity formed in the plug from the process fluid. The cavity is filled with a substantially incompressible fluid such as silicone oil herein referred to as "fill fluid". A passageway formed in the interior of the plug extends away from the cavity and to an end of the plug remote from the isolator diaphragm. A header is welded to the remote end of the plug and the connecter. The header has a recess which forms a sensor cavity with the end of the plug. The header supports the pressure sensor in the sensor cavity. The sensor cavity is also filled with the fill fluid. Since the sensor cavity is in fluidic communication with the isolator cavity through the passageway, the process fluid pressure is transmitted to the pressure sensor via the fill fluid. The pressure sensor provides an output signal proportional to the fill fluid pressure, and hence, also of the process fluid pressure.

If the pressure sensor measures a gauge pressure or a differential pressure, a mounting assembly supports the pressure sensor on the header and has a passageway that is in fluidic communication with one of the pressures. If the thermal expansion coefficient of the support is substantially different than that of the pressure sensor, temperature variations can cause stresses and strains to be produced in the pressure sensor and the mounting assembly giving rise to stress induced failure and measurement error. This error arises because thermal stresses produced in the pressure sensor cause strain in the sensing elements which are indistinguishable from those changes caused by pressure of the process fluid. Selecting a support material that has a coefficient of thermal expansion that matches that of the pressure sensor is a solution known in the art. However, a continuing problem with the prior art is hermetically sealing and affixing the support to the header.

In addition, although the above-described isolator mounting assembly is well suited for many applications, it is generally not suited for high pressure applications where measured process fluid pressure can exceed approximately 4000 psi.

SUMMARY OF THE INVENTION

A pressure transmitter includes an isolator mounting assembly for isolating process fluid from an interior cavity of the pressure transmitter. The isolator mounting assembly includes an isolator plug for receiving the process fluid line pressure and coupling the line pressure to a sensor cavity formed by a header joined to a distal end of the plug. A ring member is attached to the header and the distal end of the plug to reinforce the joint formed between the isolator plug and the header.

According to another broad aspect of the invention, a mounting assembly provided for a pressure sensor includes a base and a support having first and second opposed ends. The first end is rigidly bonded to the pressure sensor while an elastic joint joins the second end of the support to the base, the elastic joint being a material comprising at least one of an epoxy, a polyimide or a polyurethane.

DETAILED DESCRIPTION OF THE PREFERRED EMBODIMENTS

Figure 1:
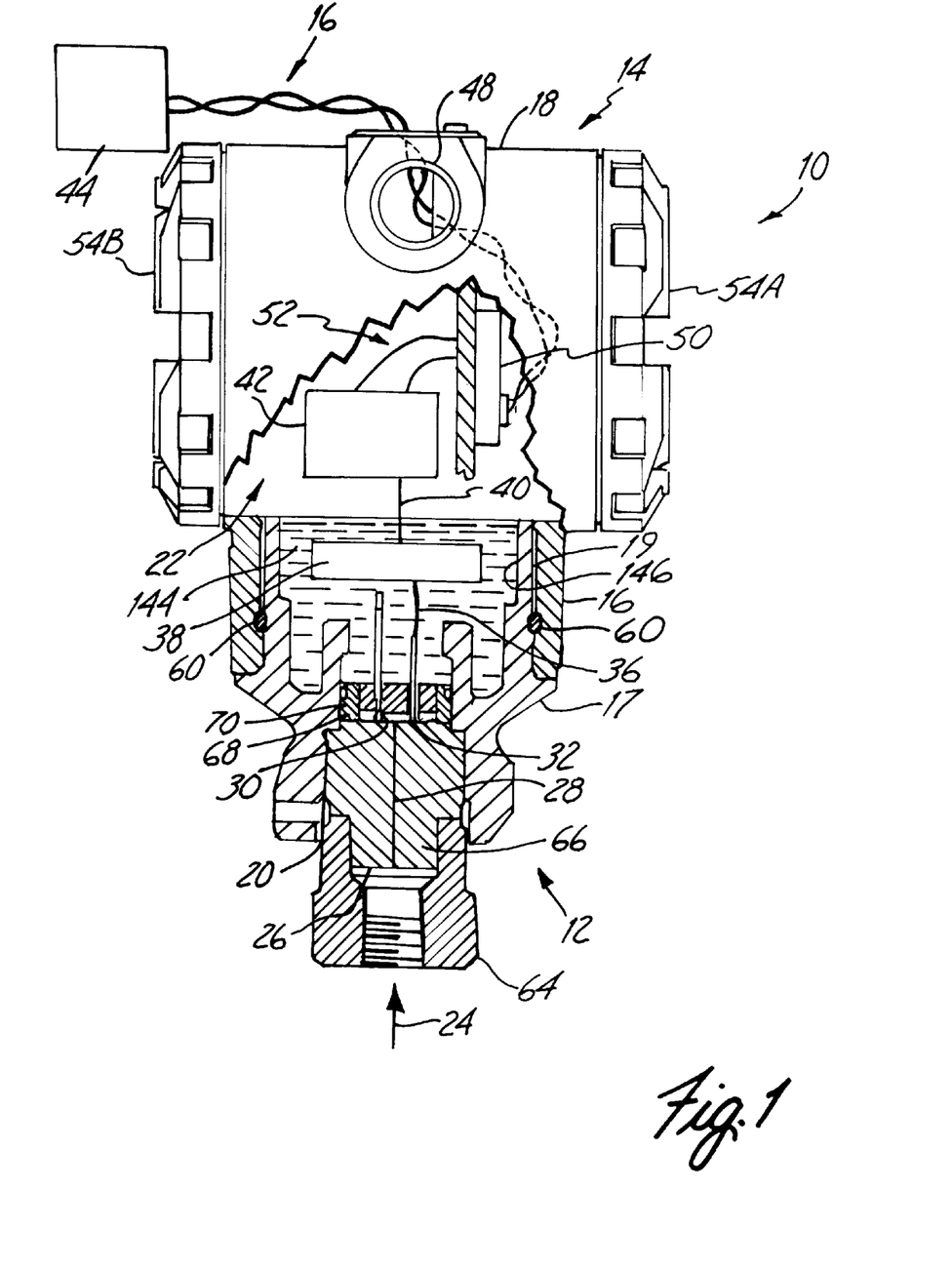
FIG. 1 is a view of a pressure transmitter illustrated partially in section and partially in block form with an isolator mounting assembly of the present invention.

A transmitter 10 having an isolator mounting assembly 12 of the present invention is illustrated in FIG. 1. The transmitter 10 includes a housing 14 having a base 16, a housing adapter 17 joined to the base 16 with threads 19, and an enlarged body 18. The housing adapter 17 includes a hole 20 that receives the isolator mounting assembly 12 of the present invention. Without the isolator mounting assembly 12 and other components of the transmitter 10 described below, the hole 20 opens into an interior cavity 22 formed in the enlarged body 18.

The isolator mounting assembly 12 isolates process fluid, herein represented by arrow 24, from entering the interior cavity 22. Generally, a process pipe, not shown, carries the process fluid 24 into contact with a compliant isolator diaphragm 26. The process fluid 24 exerts a pressure on the isolator diaphragm 26. A quantity of fill fluid provided in a passageway 28 transmits the process fluid pressure to a pressure sensor 30 provided in a sensor cavity 32, which is also filled with the fill fluid.

Lead wires 36 connect the pressure sensor 30 to a preliminary circuit 38, which in turn connects by a line 40 to a transmitter circuit 42. As is known in the art, an external DC power supply 44 powers transmitter circuit 42 over a twisted wire pair 46, which enters transmitter 10 by a port 48. The twisted wire pair 46 terminates on a terminal block 50, which is connected to the transmitter circuit 42 through lines 52. Covers 54A and 54B allow access to the terminal block 50 and the transmitter circuit 42, respectively.

In the embodiment illustrated, the pressure sensor 30 is of the known semiconductor type having a strain gauge, not shown, that responds to the pressure in the sensor cavity 32. For purposes of the invention, other known pressure sensors, fluidically coupled to the isolator diaphragm 26, can be used with the invention, for example, capacitive-based and optically-based pressure sensors.

The pressure sensor 30 provides an output signal responsive to the pressure in the sensor cavity 32, which is representative of the pressure of the process fluid 24. The sensor output signal is provided to the transmitter circuit 42 through the preliminary circuit board 38. The transmitter circuit 42 communicates the process fluid pressure by regulating the DC current flowing over the twisted wire pair 46 between four and 20 milliamperes (mA). The transmitter circuit 42 can also communicate digitally with a suitable control unit over the twisted wire pair 46 by known digital protocols, such as the HART® protocol.

Figure 2:
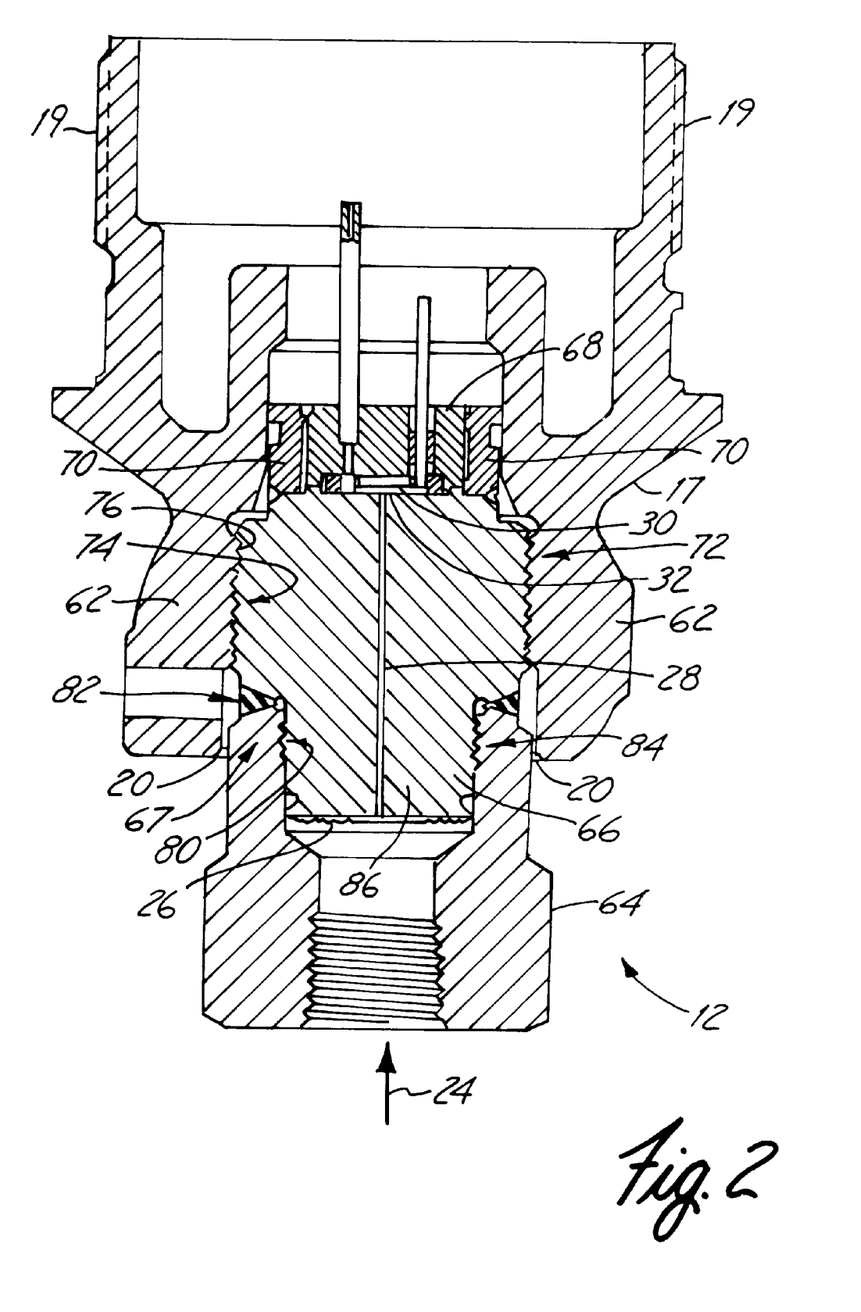
FIG. 2 is a sectional view of the isolator mounting assembly made according to the present invention mounted in a housing adapter.

FIG. 2 illustrates the isolator mounting assembly 12 and the housing adapter 17, which for purposes of the invention is considered part of housing 14. However, it should be understood that although the housing adapter 17 receives the isolator mounting assembly 12 in this embodiment, the housing adapter 17 need not be a separable part of the housing 14. In other words, if the base 16 is suitably designed to receive the isolator mounting assembly 12, the isolator mounting assembly 12 can be secured directly to the base 16.

The housing adapter 17 provides an annular wall 62 that defines the hole 20. In the embodiment illustrated, the isolator mounting assembly 12 includes a connector 64, an isolator plug 66, a header 68 and an annular header ring 70 each made from suitable corrosion resistant metals such as stainless steel (SST 316). Outwardly facing threads 72 are provided on the isolator plug 66 and threadably engage inwardly facing threads 74 on an inner surface 76 of the wall 62 to mount the isolator mounting assembly 12 to the housing adapter 17. Preferably, the threads 72 and 74 are class 1 threads that provide for a close fit to insure that there is a flame arresting path defined along this juncture.

The connector 64 provides a means for connecting the transmitter 10 to the source of process fluid 24. A connector/isolator plug joint 67 joins the connector 64 to the isolator plug 66. In the embodiment illustrated, the connector/isolator plug joint 67 comprises an annular weld 82 and reinforcing threads 80. The threads 80 engage corresponding threads 84 provided on an extending portion 86 of the isolator plug 66. The isolator diaphragm 26 is joined to the extending portion 86 in a known manner to isolate the fill fluid from the process fluid 24.

Figure 3:
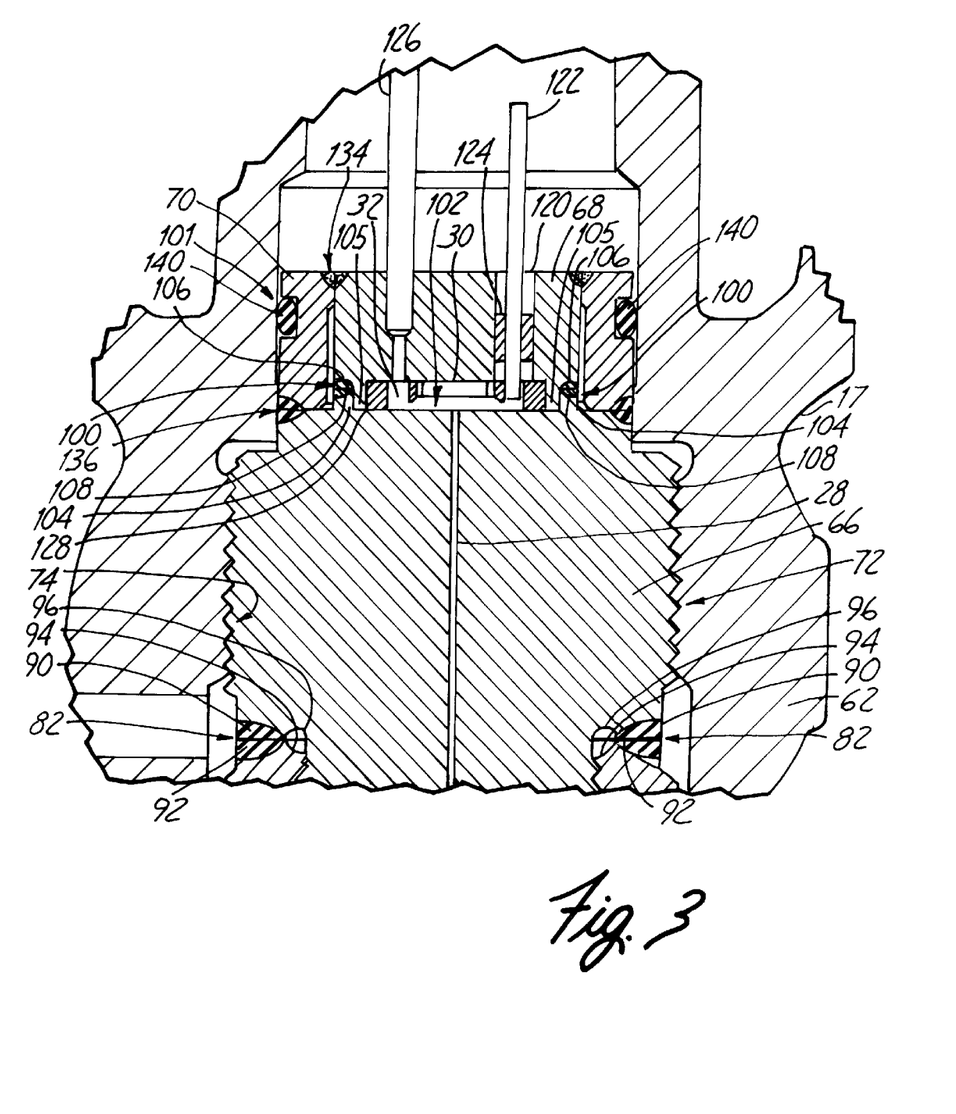
FIG. 3 is an enlarged sectional view of a portion of FIG. 2.

Referring next to FIG. 3, the annular weld 82 joins opposed surfaces 90 and 92 of the connector 64 and isolator plug 66, respectively. Preferably, as illustrated, the opposed surfaces 90 and 92 are ring-shaped being formed from grooves 94 and 96 provided in the connector 64 and the isolator plug 66, respectively. The grooves 94 and 96 are disposed so that inner annular edges of the surfaces 90 and 92 are substantially aligned. By aligning the inner annular edges of surfaces 90 and 92, stress concentration between the opposed surfaces 90 and 92 is minimized, thereby strengthening the joint formed by the annular weld 82.

An annular weld 100 joins the header 68 to an end 102 of the isolator plug 66 to form the sensor cavity 32. Preferably, the end 102 includes an extending ring portion 104, while the header 68 also has an extending ring portion 105. The extending ring portion 104 forms an annular surface 106 that faces a recessed outer annular surface 108 on the extending ring portion 105. The extending ring portions 104 and 105 are precision machined so that side walls of each overlap as illustrated in order to align the header 68 to the end 102 of the isolator plug 66.

The pressure sensor 30 is secured to the header 68 in a known manner such as silicone RTV compound for an absolute pressure transmitter. Feed through holes, one of which is illustrated at 120, accept conductors 122 that are electrically connected to the pressure sensor 30 and the preliminary circuit board 38. A glass seal 124 electrically insulates and secures the conductors 122 from the metal header 68. An oil fill tube 126 is brazed in the header 68 and provides access to the sensor cavity 32 to fill the sensor cavity 32 and the passageway 28 with the fill fluid. After filling, the oil fill tube 126 is welded closed. A spacer 128 provided in the sensor cavity 32 reduces the volume of sensor cavity 32, thereby reducing the amount of fill fluid.

The annular welds 134 and 136 join the header ring 70 to the header 68 and the isolator plug 66. The header ring 70 and annular welds 100, 134 and 136 comprise an isolator plug/header joint 101. The header ring 70 and annular welds 134 and 136 reinforce the annular weld 100, thereby further securing the header 68 to the isolator plug 66. If desired, an o-ring seal 140 can be used with the header ring 70 to engage an inner surface of the housing adapter 17 to further isolate and seal the interior cavity 22. Referring back to FIG. 1, a potting material 144 is disposed in a cavity 146 of the housing adapter 17 to secure the preliminary circuit board 38 therein and to further seal the interior cavity 22.

As stated above, the isolator mounting assembly 12 isolates the interior cavity 22 from the process fluid 24. The isolator mounting assembly 12 is particularly well suited for high pressure applications because the connector/isolator plug joint 67 and the isolator plug/header joint 101 are reinforced so that the most probable paths for process fluid 24 to enter the interior cavity 22 begin with the isolator diaphragm 26 and extend through the sensor cavity 32. However, if the process fluid 24 enters the sensor cavity 32, it will cause the sensor 30 to fail. The transmitter circuit 42 detects failure of the sensor 30 and provides an alarm indication, notifying an operator of a problem with the transmitter 10 before the process fluid 24 corrodes through the header 68 and enters the interior cavity 22.

Figure 4:
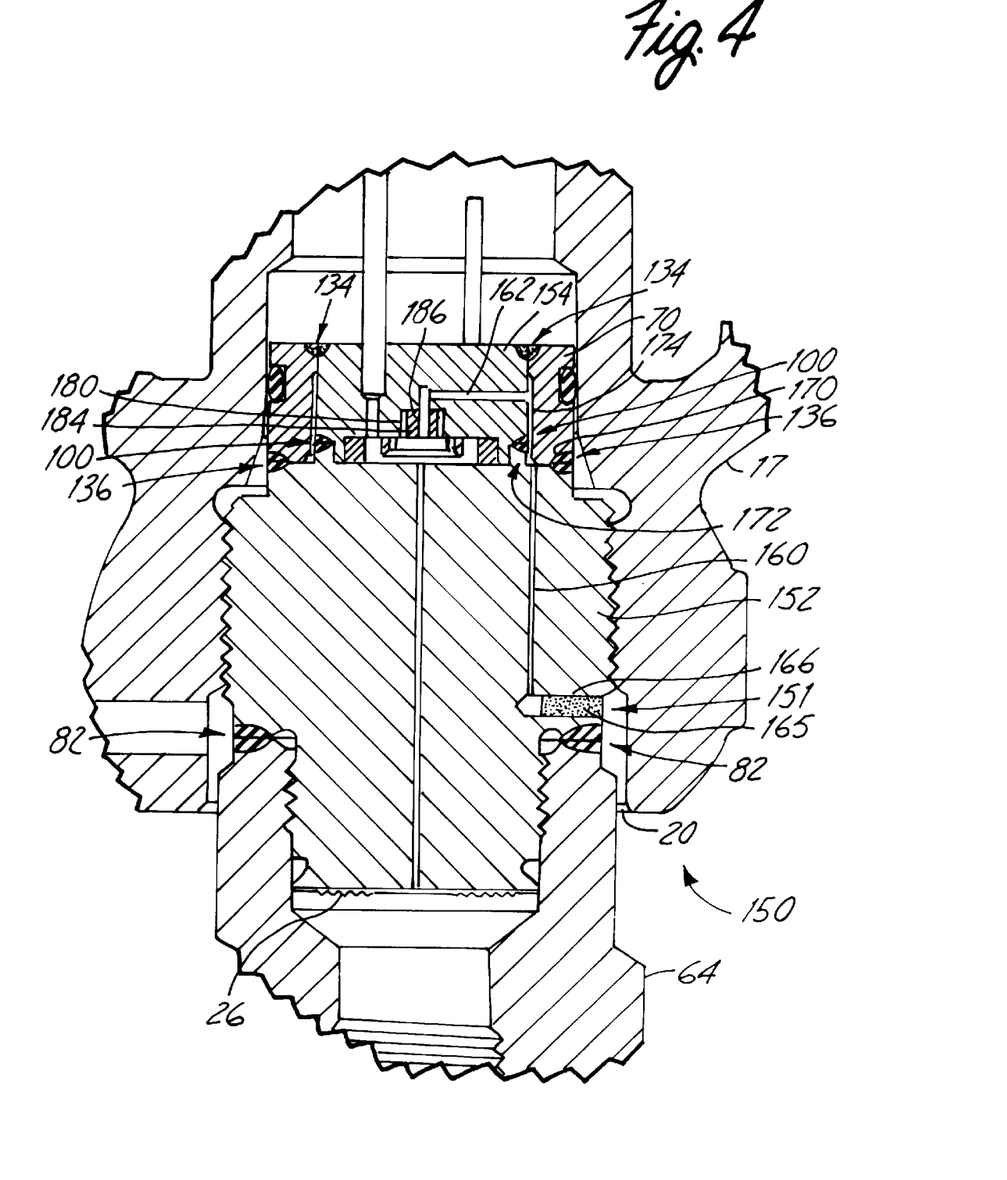
FIG. 4 is a sectional view of a modified isolator mounting assembly made according to the present invention.

FIG. 4 illustrates an isolator mounting assembly 150 having a gauge venting system 151 that is suitable for use with a gauge pressure transmitter. The gauge venting system 151 allows atmospheric gas to directly engage the pressure sensor 30. Like the isolator mounting assembly 12 described above, the isolator mounting assembly 150 is secured to the housing adapter 17 and includes the connector 64, an isolator plug 152, a header 154 and the header ring 70. Preferably, welds 82, 100, 134 and 136 join the connector 64, the isolator plug 152, the header 154 and the header ring 70 in the manner described above. As is well known in the art, a gauge pressure transmitter references the measured pressure of the process fluid 24 to atmospheric pressure. In the embodiment illustrated, atmospheric pressure is provided to the pressure sensor 30 through a passageway 160 in the isolator plug 152 that communicates with a passageway 162 in the header 154. Preferably, the passageways 160 and 162 are of suitable diameter and sufficient length to provide flame arresting paths.

In the embodiment illustrated, atmospheric pressure enters the passageway 160 through an opening 166 provided in the isolator plug 152 and opening to the hole 20. If desired, a suitable filter material 165 such as porous metals and Teflon® can be disposed in the opening 166 to prevent contaminants from entering the passageway 160. On an end 170 of the isolator plug 152 remote from the opening 166, the passageway 160 opens to a chamber 172. Preferably, the chamber 172 is formed by an inner annular groove 174 provided in the header 70. Except for the openings provided by the passageways 160 and 162, the chamber 172 is sealed by welds 100, 134 and 136. The passageway 162 opens to the chamber 172 on one end, and on an end remote from the chamber 172, the passageway 162 opens to a cylindrical recess 180 provided in the header 154, forming part of the sensor cavity 32.

In the event process fluid 24 was present in the sensor cavity 32 and the sensor 30 or mounting assembly thereof, discussed below, were to fail, allowing process fluid 24 into the recess 180, the gauge venting system 151 prevents the process fluid 24 from entering the interior cavity 22. Specifically, the passageway 162 directs the process fluid 24 from the recess 180 to the chamber 170, which in turn, directs the fluid to passageway 160 and away from the interior cavity 22 due to the presence of welds 100, 134 and 136. Leakage of process fluid 24 from the opening 166 and ultimately from the hole 20 provides a visual indication that this type of failure has occurred.

Figure 5:
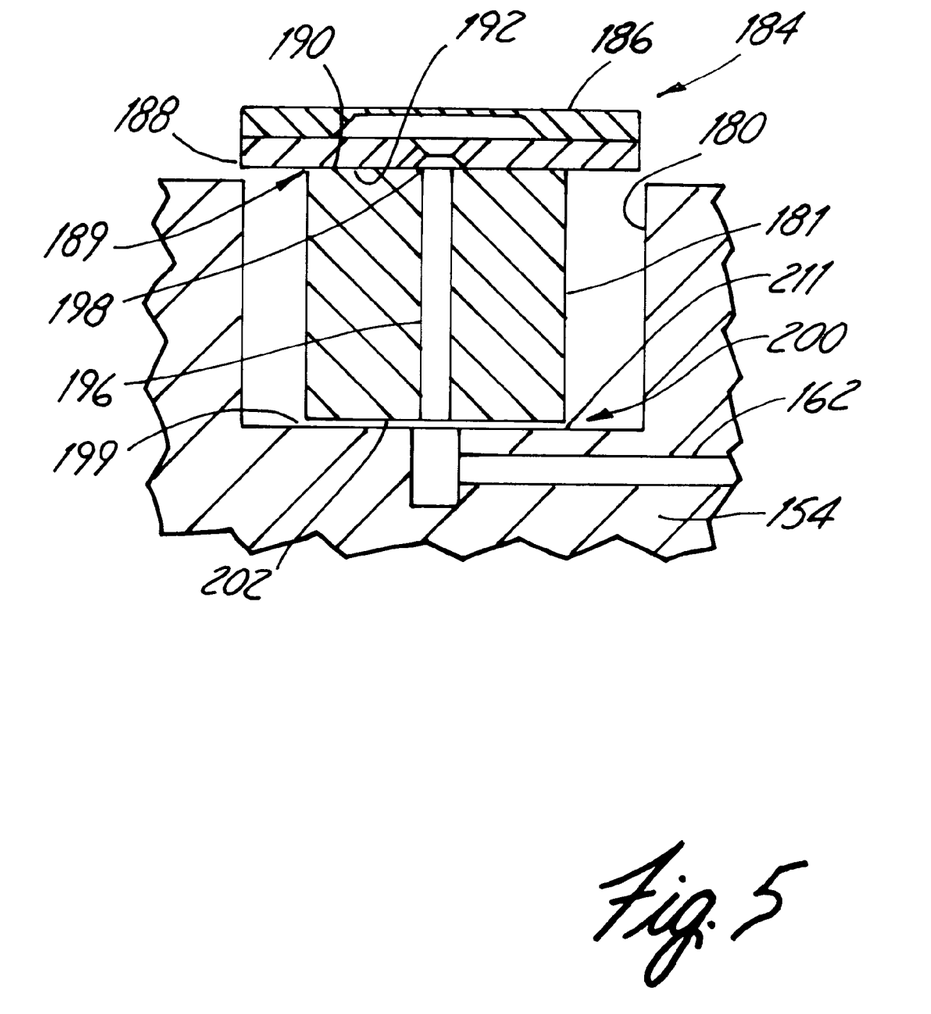
FIG. 5 is an enlarged sectional view of a portion of FIG. 4.

Referring next to FIG. 5, a support 181 located in the recess 180 supports a differential pressure sensor 184 in the sensor cavity 32. Preferably, the differential pressure sensor 184 comprises a silicon chip 186 having a diaphragm therein joined to a silicon support base 188, which in turn mounts to the support 181. The support 181 is of unitary construction, consisting essentially of Pyrex® borosilicate glass, which has a thermal coefficient of expansion substantially equal to that of the silicon support base 188. Alternatively, the support 181 can comprise a suitable ceramic. An anodic bond 189 joins an end surface 190 of the glass support 181 to a lower surface 192 of the silicon support base 188. The anodic bond 189 provides a hermetic seal about a passageway 196 in the glass support 181 and an orifice 198 in the support base 188 that transmit atmospheric pressure from the passageway 162 in the header 154 to the diaphragm of silicon chip 186. The anodic bond 189 is considered a "rigid" joint having little elasticity.

In contrast to the rigid joint 189 between the end surface 190 and the lower surface 192, an epoxy 199 provides a relatively "compliant" or elastic joint 200 that bonds and hermetically seals an end surface 202 of the support 181 to the header 154 so that the atmospheric gas directly engages the pressure sensor 30. Preferably, the epoxy 199 is the sole means of attaching the support 181 to the header 154. The epoxy 199 absorbs strain resulting from the difference in thermal expansion between the header 154 and the glass support 181. Unlike the prior art which has taught coating the end surface 202 with a metal in order to solder the glass support 181 to the header, the end surface 202 of the present invention is preferably uncoated and remains glass, thereby eliminating assembly steps and reducing manufacturing costs.

Preferably, the epoxy is solvent and thinner free to provide thin bond lines and to reduce the possibility of outgassing or weight loss into the sealed sensor cavity 32, which can cause measurement errors. Solvent and thinner free epoxies also reduce stress inducing voids that can lead to fractures in the glass support 181 and loss of thermal conductivity, which can lead to temperature induced errors. In a further preferred embodiment, the epoxy 199 does not contain any fillers. Use of a filler free epoxy improves the seal formed by the epoxy between the glass support 181 and a support surface 211 of the header 154 since such fillers can have a thermal coefficient of expansion different than the epoxy resin contained therein. A suitable epoxy for high pressure applications is EPO-TEK H77 by Epoxy Technology, Inc. of Billerica, Mass. hermetic sealing epoxy.

It should be understood that although the elastic joint has been described as formed with the epoxy 199, other suitable organic sealing adhesive materials can be used. For instance, suitable die attach polyimides such as available from Ablestik Laboratories of Rancho Dominquez, Calif. and suitable polyurethanes such as available from Minnesota Mining and Manufacturing Company of St.Paul, Minn. also can be used in place of the epoxy 199.

Although the elastic joint 200 has been described and illustrated as a means for attaching the support 181 to the header 154 to provide a hermetic seal about the passageway 162 for use with a gauge pressure transmitter, it should be understood that a gauge pressure transmitter is merely one type of a differential pressure transmitter and that the elastic joint 200 can be used with other forms of differential pressure transmitters.

Although the present invention has been described with reference to preferred embodiments, workers skilled in the art will recognize that changes may be made in form and detail without departing from the spirit and scope of the invention.

What is claimed is:

1. A transmitter connectable to a process line and providing an output responsive to a pressure in the process line, the transmitter comprising:

a housing forming a wall around a hole extending into an interior cavity formed in the housing;

a sensor for sensing the pressure;

a circuit coupled to the sensor and providing the output; and an isolating assembly mounted in the hole isolating fluid in the process line from the interior cavity, the isolating assembly comprising:

an isolator plug insertable into a process fluid passage and joined to the housing, the isolator plug having first and second spaced end surfaces, the first end surface forming a process fluid pressure surface and, having a diaphragm coupling the pressure via a passageway to a distal end of the plug;

a header assembly joined to the second end surface of the plug to form a sensor cavity holding the sensor and receiving the pressure from the passageway;

a first connection between the header assembly and the second end surface of the plug to secure the header assembly to the plug;

a second connection between the header assembly and the second end surface of the plug to secure the header assembly to the plug;

the header assembly including a header and a ring member joined to the header, the first connection being formed on the header and the second connection being formed on the ring member to secure the header assembly to the plug.

2. The transmitter of claim 1 wherein the first connection is an annular weld that joins the header to the second end surface of the plug, and the second connection is a second annular weld that joins the ring member to the header and a third annular weld joins the ring member to the isolator plug.

3. The transmitter of claim 1 and a connector having a bore extending from a first end to a second end, and the isolator includes first and second plug portions, the first plug portion including an outer surface having a first outer dimension sized for insertion into the hole formed in the housing and the second plug portion including a second outer surface having a second outer dimension for insertion into the bore of the connector and the isolator plug including a stepped surface between the first and second portions, the connector being connectable to the process line at the first end and joined to the stepped surface of the isolator plug at the second end.

4. The transmitter of claim 3 and an annular weld joining the second end of the connector to the plug.

5. The transmitter of claim 1 and a second passageway extending through the header, the second passageway coupling a second pressure to the sensor.

6. The transmitter of claim 5 and a recess formed between opposed surfaces of the header and the ring member, the recess opening to the second passageway and coupling the second pressure.

7. The transmitter of claim 5 and a third passageway formed in the plug and fluidically communicating with the second passageway.

8. The transmitter of claim 7 wherein the wall threadably engages the plug along a threaded portion, and wherein the third passageway has an opening remote from the threaded portion.

9. The transmitter of claim 8 and a filter material located in the third passageway.

10. The transmitter of claim 5 and a tube joined at a first end to the header about an opening of the second passageway with an epoxy, the tube supporting the sensor in the sensor cavity and coupling the second pressure to the sensor.

11. A transmitter connectable to a process line and providing an output responsive to a process pressure in the process line with respect to atmospheric pressure, the transmitter comprising:
- a housing forming an inner wall around a hole extending into an interior cavity formed in the housing;
- a sensor for sensing the pressure;
- a circuit coupled to the sensor and providing the output;
- an isolator plug disposed in the hole having: a diaphragm therein coupling the process pressure via a first passageway to a distal end of the plug; and a second passageway extending from a first surface to a second surface for carrying atmospheric pressure to the sensor.

12. A transmitter connectable to a process line and providing an output responsive to a pressure in the process line, the transmitter comprising:
- a housing forming a wall around a hole extending into an interior cavity formed in the housing;
- an isolating assembly mounted in the hole isolating fluid in the process line from the interior cavity, the isolating assembly comprising:
  - an isolator plug, the isolator plug having a diaphragm for receiving the pressure;
  - a connector having a bore extending between first and second spaced ends of the connector;
  - the isolator plug including first and second plug portions,
    - the first plug portion including a first outer surface having a first outer dimension sized for insertion into the hole formed in the housing and engagement with the wall surrounding the hole; and
    - the second plug portion including a second outer surface having a second outer dimension sized smaller than the first outer dimension for insertion into the bore of the connector; and
  - the isolator plug including a stepped surface between the first and second plug portions, the stepped surface having a first mating surface surrounding a first groove, the connector having a second mating surface surrounding a second groove, the connector being disposed such that the first and second grooves open to each other; and
  - an annular weld joining the first mating surface to the second mating surface.

13. The transmitter of claim 11 and further comprising:
- a header joined to the distal end of the plug to form a sensor cavity holding the sensor and receiving the process pressure from the first passageway, the header including a third passageway for carrying atmospheric pressure to the sensor; and
- a ring member joined to the isolator plug and the header and forming a recess opening to the second passageway and the third passageway for carrying the atmospheric pressure.

14. The transmitter of claim 13 and further comprising:
- a tube having a first end bonded to the pressure sensor and a second end opening to the third passageway for carrying the atmospheric pressure; and
- an elastic joint between the second end of the support and the header, the elastic joint including a material selected from the group consisting of an epoxy, a polyimide and a polyurethane.

15. The transmitter of claim 14 wherein the tube comprises glass and the second end has a bonding surface consisting essentially of a glass.

16. The transmitter of claim 15 wherein an anodic bond joins the first end to the pressure sensor.

17. The transmitter of claim 11 wherein the isolator plug includes a portion joined to the inner wall, the portion being disposed between the first surface and the second surface.

18. The transmitter of claim 17 wherein the second passageway opens to the hole.

19. The transmitter of claim 13 wherein the recess opening comprises an annular recess formed about the header.

20. The transmitter of claim 19 wherein the recess comprises an inner annular groove formed in the ring member.

21. The transmitter of claim 11 wherein the second passageway comprises a flame arresting path.

22. The transmitter of claim 13 wherein the third passageway comprises a flame arresting path.

23. A transmitter connectable to a process line and providing an output responsive to a pressure in the process line, the transmitter comprising:
- a housing forming an inner wall around a hole extending into an interior cavity formed in the housing;
- an isolator plug, the isolator plug having a diaphragm therein coupling the pressure via a passageway from a diaphragm end to a sensor end thereof;
- a connector having a bore extending from a first end to a second end;
- the isolator plug including:
  - first and second plug portions, the first plug portion including a first outer surface having a first outer dimension sized for insertion into the hole formed in the housing and engagement with the wall surrounding the hole, and the second plug portion including a second outer surface having a second outer dimension sized smaller than the first outer dimension for insertion into the bore of the connector; and
  - a stepped surface between the first and second portions;
- the connector connectable to the process line at the first end and secured to the stepped surface of the isolator plug at the second end;
- an annular weld securing the isolator plug to the connector;

a sensor for sensing the pressure; and a circuit coupled to the sensor and providing the output.

24. The transmitter of claim 23 wherein the isolator plug includes a mating portion mating with the inner wall, the mating portion disposed between the diaphragm end and the sensor end.

25. The transmitter of claim 24 wherein the annular weld is disposed between mating portion and the diaphragm end.

26. The transmitter of claim 23 wherein the connector is spaced-apart from the inner wall.

27. The transmitter of claim 23 wherein annular weld joins a first mating surface of the isolator plug with a second mating surface of the connector, and wherein the first mating surface includes a first groove disposed inwardly from the annular weld and the second mating surface includes a second groove disposed inwardly from the annular weld, and wherein the first and second grooves open to each other.

28. The transmitter of claim 23 wherein the isolator plug includes an extending portion disposed between the annular weld and the diaphragm end.

29. The transmitter of claim 28 wherein the extending portion includes a first set of threads, and wherein the connector includes a second set of threads that mate with the first set of threads on the extending portion.

30. The transmitter of claim 23 and further comprising:

a ring member joined to the isolator plug and the header.

31. The transmitter of claim 30 wherein a second annular weld joins the header to the sensor end of the plug, a third annular weld joins the ring member to the header and a fourth annular weld joins the ring member to the isolator plug, and wherein the first-mentioned annular weld is larger than the second annular weld.

* * * * *